United States Patent [19]

Shepard, et al.

[11] Patent Number: 4,804,896
[45] Date of Patent: Feb. 14, 1989

[54] VIBRATORY INTERFERENCE SENSOR

[75] Inventors: G. Dudley Shepard, Exeter, N.H.; I. Stuart Smith, Chelmsford, Mass.; Stephen R. Christensen, Nashua, N.H.; Richard Lu, Lowell, Mass.

[73] Assignee: University of Lowell, Lowell, Mass.

[21] Appl. No.: 103,113

[22] Filed: Sep. 30, 1987

[51] Int. Cl.[4] ............................................. G05B 19/42
[52] U.S. Cl. .................................. 318/568; 364/513; 901/31; 901/32; 901/38
[58] Field of Search .................... 318/568; 901/31, 32, 901/38; 364/513

[56] References Cited

U.S. PATENT DOCUMENTS

| | | | |
|---|---|---|---|
| 3,906,325 | 9/1975 | Salmon | 318/569 |
| 4,132,937 | 1/1979 | Engelberger et al. | 318/568 |
| 4,243,923 | 1/1981 | Whitney et al. | 318/561 |
| 4,401,945 | 8/1983 | Juengel | 324/207 |
| 4,445,273 | 5/1984 | Van Brussel et al. | 901/23 X |
| 4,472,668 | 9/1984 | Mutschler et al. | 318/568 |
| 4,611,843 | 9/1986 | Burger et al. | 901/31 X |
| 4,694,230 | 9/1987 | Slocum et al. | 318/568 |

OTHER PUBLICATIONS

Nevins et al., "Robot Assembly Research and Its Future Applications", General Motors Research Symposium on Computer Vision and Sensor Based Robots, Warren, MI, Sep. 25-26, 1978.

S. H. Drake, "Using Compliance in Lieu of Sensory Feedback for Automatic Assembly", M.I.T. (Ph.D. Thesis—Sep. 1977).

Anderson et al., "Application of Laser Interferometry to Robotics", Proc. SPIE Int. Soc. Opt., Eng. (USA), 360, 207–213, 24–27, (Aug. 1982).

Primary Examiner—William M. Shoop, Jr.
Assistant Examiner—Saul M. Bergmann
Attorney, Agent, or Firm—Hamilton, Brook, Smith & Reynolds

[57] ABSTRACT

An apparatus and method is described for inserting pins in holes wherein either the pin or the hole is chamfered or beveled. One part is vibrated with respect to the other in a plane orthogonal to the direction of insertion. One part is incrementally moved in the direction of insertion. When interference caused by the contact is sensed, the magnitude of the interference is determined and used to reposition the center-line of the one part in the orthogonal plane until the pin is fully inserted.

8 Claims, 3 Drawing Sheets

VIBRATORY INTERFERENCE SENSOR

BACKGROUND ART

There has been active and extensive research into the problems of automatic or robotic assembly of parts into finished products. One of the most frequently performed part mating tasks is the insertion of pegs or pins into holes without "jamming", i.e., causing the peg or pin to become stuck in an askew position in the hole. Consequently, this task has received much scrutiny and attention. (See Nevins, J. L., and Whitney, D. E., "Robot Assembly Research and Its Future Applications," General Motors Research Symposium on Computer Vision and Sensor Based Robots, Warren, MI., Sept. 25-26, 1978.)

While the problem is simply stated, i.e., how to automate the insertion of a peg into a hole without jamming; the solution is not as easily attained.

Research has shown that:

(a) for a given friction coefficient between peg and hole, assembly without jamming requires that a certain relationship between the radial-to-axial contact force ratio and the jamming moment-to-axial force ratio must be satisfied; and (b) robotic assembly of simple rigid machine pieces, without adaptability, i.e., without some means for controlling the assembly forces and moments, has only erratic success because of forces and moments induced by unspecified compliances in the robot or the assembly fixtures.

A passive adaptive insertion device, called the Remote Center Compliance (RCC) was developed by Drake and Watson (See Drake, S. H., "The Use of Compliance in a Robot Assembly System," IFAC Symposium on Information and Control Problems in Manufacturing Technology, 1977 and Watson, P. C., "A Multidimensional System Analysis of the Assembly Process as Performed by a Manipulator", 1st North Am. Robot Conf., 1976.) This device makes possible chamfered peg-hole insertions with small (even negative) clearances, 1mm (0.040″) or larger initial position error, and a few degrees of misalignment. The RCC substantially reduces the burden on a robotic insertion system for mechanical accuracy and resolution. The proper functioning of a robot-held RCC, however, requires that the compliance of the RCC be much larger than that of the robot. This condition may be violated by large robots, or by robots with many degrees of freedom (axes).

Active adaptive insertion assembly devices have also been developed (See U.S. Pat. Nos. 3,906,325, 4,243,923 and 4,445,273) wherein a beveled peg is moved in the direction of hole insertion until contact occurs between the peg bevel and the edge of the hole. Any further motion in the insertion direction causes an interference force. The moment of the interference force is sensed by strain gages mounted on the peg or on the robot gripper. Active adaptive strategy uses the interference force as a feedback signal to a robot position control algorithm, which acts to reduce the interference force, thereby centering the pin.

Since interference force is utilized for the feedback signal, this specie of an active adaptive assembly system is referred to as a force interference sensor system. It suffers from several disadvantages. First, the strength of the feedback signal depends upon the amount of interference and the sensitivity of the force sensor, the sensitivity of which may not conveniently be increased without also increasing background signal noise caused by mechanical disturbances in the assembly environment. The force feedback signal, being a static variable, must therefore be filtered by a low-pass filter to improve the signal-to-noise ratio. The time required to filter a signal varies inversely with the filter bandwidth. This leads to a second disadvantage: the processing of the force feedback signal will be slow whenever low frequency environmental noise sources are significantly present. Finally, the force interference system is susceptible to "jamming" whenever certain relationships between the radial-to-axial contact force ratio and the jamming moment-to-axial force ratio are violated. The jamming moment results from two-point contact between the pin and the hole, that is, whenever the misalignment angle $\theta = 2c/L$, where c is the radial clearance and L is the length of pin penetration.

Consequently, a need exists for a system for insertion of chamfered pins into holes with improved feedback signal strength adjustability and signal processing speed and which has the potential of alleviating or reducing the tendency for misaligned pins to jam in holes.

DISCLOSURE OF THE INVENTION

The method and apparatus of the invention comprises a system for inserting a part having a clyindrical projecting portion (hereafter the "inserting part"), such as a peg or pin, into a hole made in another part member (hereafter "receiving part"). The part with the pin or peg is positioned adjacent to the hole with the end of the peg or pin facing the hole in the receiving part. The receiving part is vibrated relative to the inserting part in an XY plane, orthogonal to the direction of insertion of the inserting part into the hole. The inserting part is then moved in the direction of insertion, i.e., the Z axis, until contact is made with a vibrating edge of the hole.

An accelerometer, mounted on the insertion device, senses such contact and generates an electrical signal proportional thereto (hereafter the "interference signal"). This interference signal is electronically processed, such as by pre-amplification, amplification, filtering and A-D conversion, to provide a signal to a controller for moving the inserting part in a plane, i.e., X,Y plane, orthogonal to the direction of insertion, i.e., Z direction, so as to minimize or eliminate contact between the inserting part and the vibrating hole edge when the inserting part is again moved in the direction of insertion.

The inserting part is then moved in the direction of insertion until either contact is made or the pin on the inserting part is completely inserted in the hole. If contact is made again, the sensing and repositioning steps are repeated, in accordance with a program which minimizes the number of successive moves required in order to insert the pin in the hole.

The method and apparatus of the invention provides a simple means for adjusting the interference signal strength, merely by increasing the vibratory acceleration of the hole by increasing the drive frequency w. The pin acceleration is proportional to the hole acceleration $w^2\Delta$ and the amount of interference. For a given pin-hole interference and given hole drive amplitude $\Delta$, the pin tip acceleration, and therefore, the pin acceleration sensed, can be increased simply by increasing the drive frequency w. Furthermore, it is possible in the present invention to take advantage of the adjustability of the drive frequency w to increase the speed of signal processing. Assuming, as in the case of the force interference sensor system, the need for filtering to achieve adequate signal-to-noise ratio, it is possible to adjust the drive frequency w to a low amplitude portion of the background acceleration noise spectrum, thereby lessening the need for a narrow band-pass filter centered on the drive frequency w. Again, since filtering speed varies inversely with the filter bandwidth, a less narrow filter will reduce signal processing time.

Furthermore, as mentioned in the reference Dunne, M. J., "An Experiment Using Programmable Robot Arms", Proc. 7th Int. Sym. on Industrial Robots (1977), vibration has been shown to aid in the assembly process by minimizing jamming during insertion.

BEST MODE OF CARRYING OUT THE INVENTION

Figure 1:
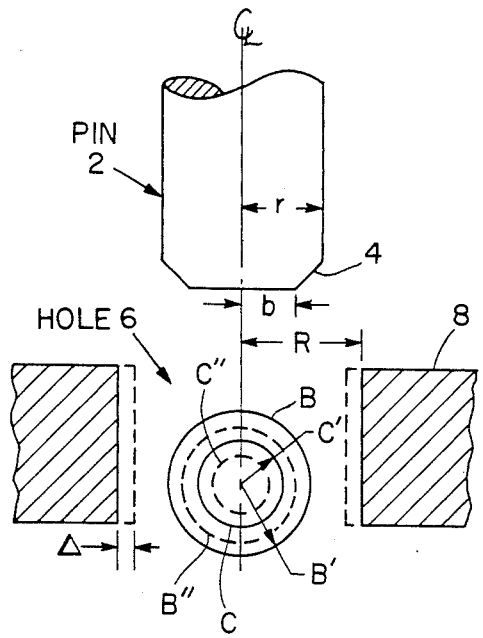
FIG. 1 is a schematic drawing illustrating the assembly geometry when inserting a part having a cylindrical projection into a hole.

Referring now to FIG. 1, some of the terms used in defining the invention will be explained in connection therewith. The object is to insert a part (inserting part) having a cylindrical projection, such as pin 2 of radius r, into a round hole 6 of radius R on a receiving member 8. Either the pin end 4 is chamfered, as shown in FIG. 1, or the hole is chamfered. The chamfered end radius b of the pin is necessarily less than the pin radius r.

Depicted below the pin 2 are solid circles C and B and two dashed circles C" and B" for the purpose of illustrating certain clearance relationships between the pin 2 and the hole 6. The two solid circles, C and B, have radii of radius C' and B', respectively. These C and B circles depict the respective bevel and clearance circles of radius C' and B'. For the conditions of no vibration or angular pin misalignment; and when the bevel of the pin is in contact with the edge of the hole, the centerline C/L of the pin will lie in the annular area between bevel circle B, of radius $B'=R-b$, and clearance circle C of radius $C'=R-r$.

If the receiving part 8 is then vibrated in the X,Y plane (shown by arrows) at a radian frequency w and amplitude $\Delta$, indicated by the dashed vertical lines about the hole 6, initial contact will occur upon insertion of pin 2 in the Z direction, and the centerline C/L will lie within the "apparent" bevel circle B" of radius $B'-\Delta$.

The object of the method and apparatus of the present invention is, therefore, to position the centerline of the pin 2 within the apparent clearance circle C" of radius $C'-\Delta$.

Figure 2:
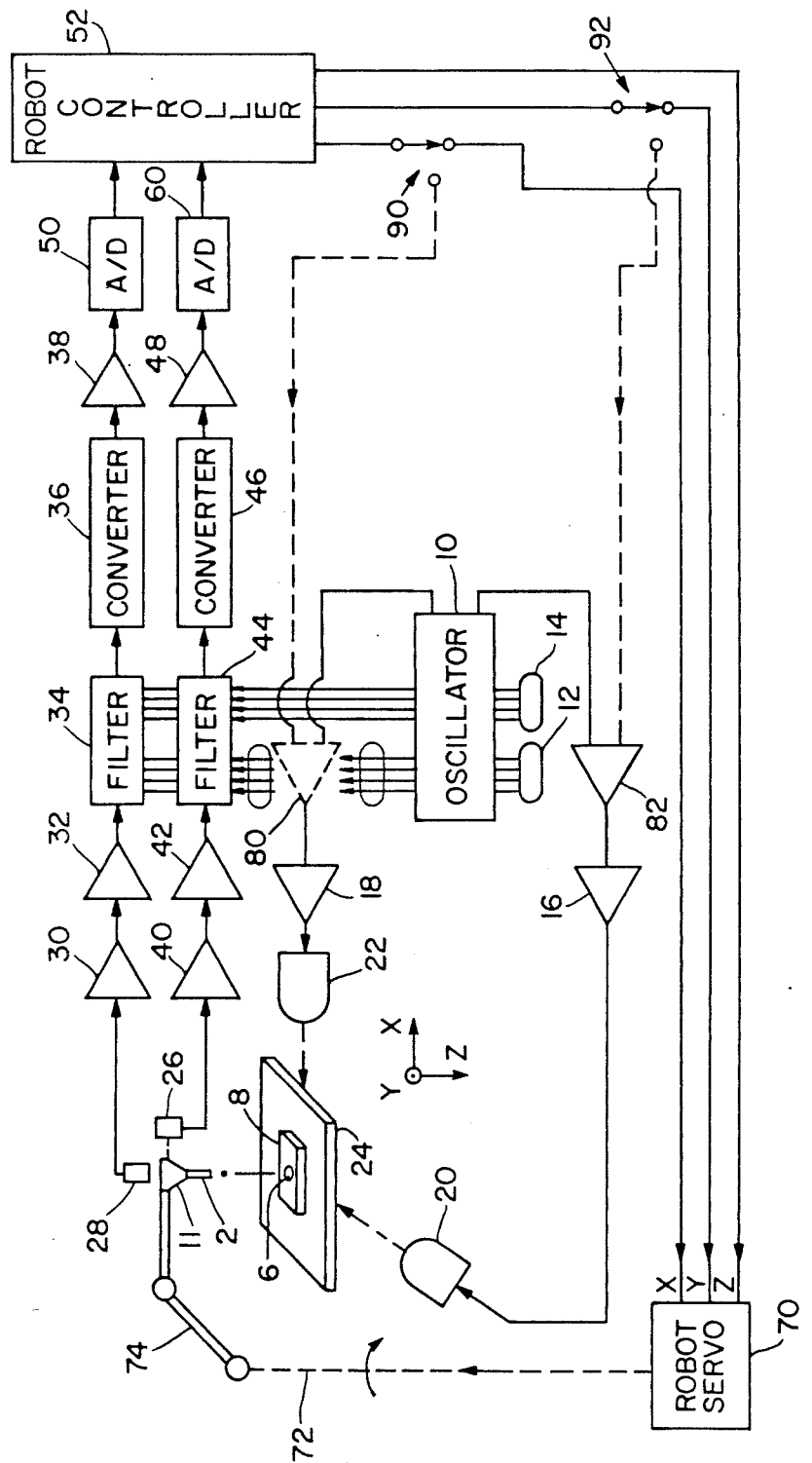
FIG. 2 is a block diagram of the apparatus of the invention.

Referring now to FIG. 2, there is depicted in overall schematic diagram form, the apparatus of the invention for automatically inserting a part, such as chamfered pin 2, into a hole 6 in a receiving piece or member 8. The pin 2 is held by robot grippers 11, controlled by robot controller 52. In response to controller 52, the grippers 11 move pin 2 in the X,Y plane, as well as in the direction Z orthogonal to the X,Y plane.

Receiving member 8 with hole 6 is mounted on a base 24 for vibration in the X,Y plane. Well-known vibration mechanisms, in the form of shakers 20 and 22, provide vibratory displacement of base 24, in accordance with electrical signals received from power amplifiers 16 and 18, respectively. Power amplifiers 16 and 18 are controlled by signals generated from quadrature oscillator 10, preamplified by amplifiers 80 and 82. The oscillator frequency is controlled by frequency select switches 12 and 14. Power amplifier 18 has as its input a cosine waveform, while power amplifier 16 has a sine waveform of equal amplitude, so that the inputs to the shakers 20 and 22, respectively, are of a sine/cosine nature, to generate a circular XY displacement of $\Delta$ amplitude of base 24 and, likewise, hole 6 of member 8 mounted on the base.

The robot grippers 11 first position the pin 2 slightly above the hole 6 so that the pin centerline C/L lies within circle B. The peg is then brought towards the hole in the direction of insertion Z until accelerometers 26 and 28 generate a signal indicating that contact has been made between the bevel 4 on the pin and the edge of the hole 6 in receiving piece 8. A sequence of moves in the $+X$, $-X$, $+Y$, $-Y$ direction are made with the grippers under the control of the robot controller 52, which reduces the contact between the pin 2 and the hole 6. In other words, the pin centerline C/L is made to move more in a direction to lie within the apparent clearance circle C".

If the pin is not completely inserted in each attempt, an additional sequence of unit moves is made to again attempt to insert the peg, until the peg is completely inserted.

Figure 3:
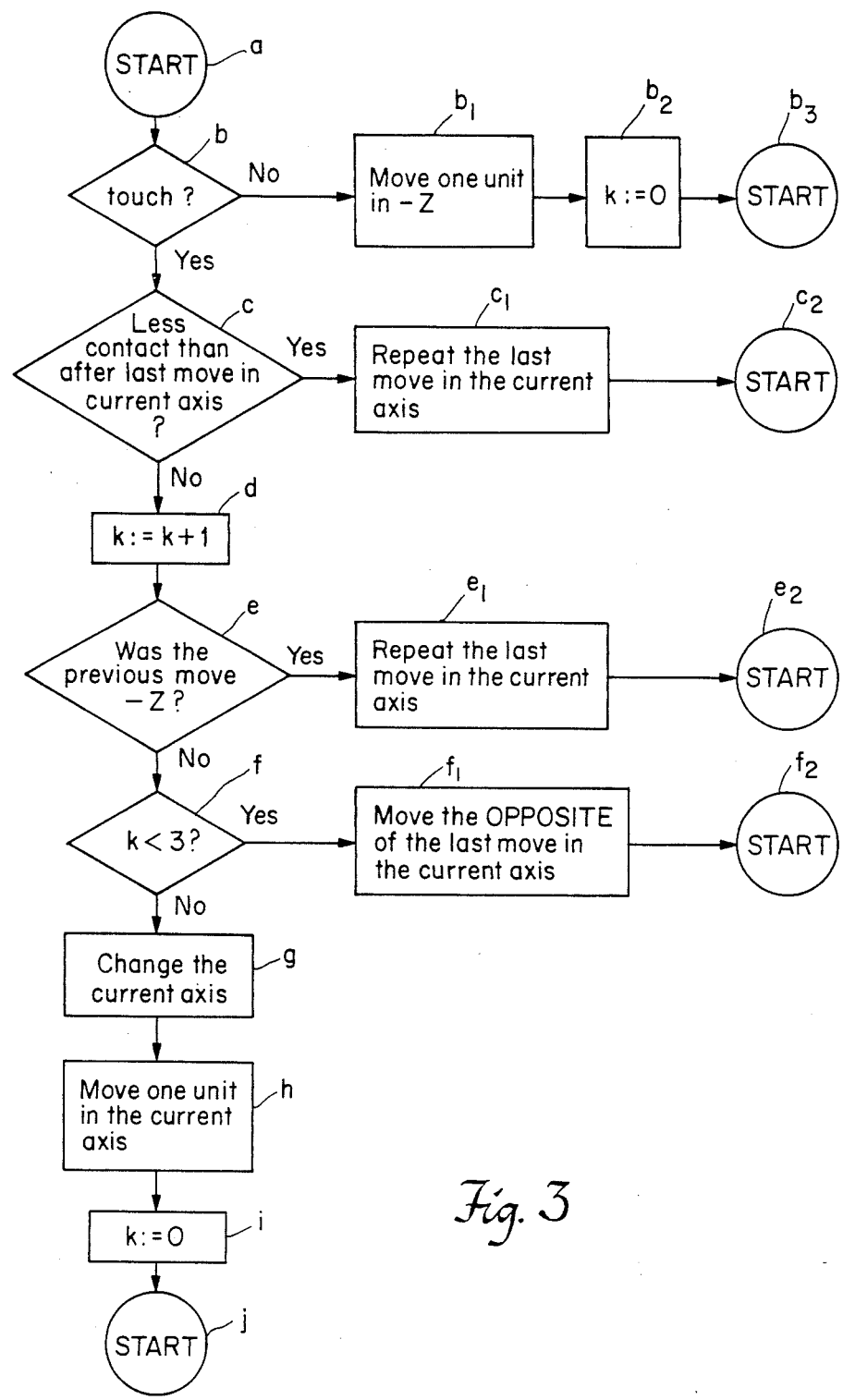
FIG. 3 is a flow diagram of a software program for the implementation of the invention.

A typical sequence of movements and operation of the robot gripper 11 under control of controller 52 is shown in FIG. 3, wherein the "current axis" is the axis X or Y in which the robot makes all of its horizontal moves until the program determines that no further progress can be made in that axis. Thus, referring to FIG. 3, when the gripper is first started (step a) in one increment in the Z direction, contact is either sensed, or not sensed, by the accelerometers (TOUCH?). If no contact is sensed (Step b No), then the grippers are ordered to move one increment or one unit in the $-Z$ direction (step b1).

The variable k in the flow chart is a count which corresponds to the number of consecutive unit moves made in the X or Y direction, whichever is the current axis, without reducing the interference of the pin. Thus, in step b2, the count $k=0$ is stored and the gripper is started one increment in the Z direction, again (step b3).

If, on the other hand, in step b, a Touch occurs, meaning that the chamfered portion of the pin has contacted the edge of the vibrating clearance hole, then the controller decides, based on the signal received from the accelerometers, whether or not the contact is less (Yes) than after the last move in the current axis (See step c under Yes) or not (No). If the contact is less (Yes), the gripper is programmed to repeat the last move in the current axis (step c1) and the program returns to START (step c2).

If the answer to the question in step c is No, then the counter is set to $k+1$. Also, in accordance with step e, the controller determines if the previous move was in the $-Z$ direction. If Yes, the last move in the current axis is repeated (step e1) and the program returns to START (step e2). If the previous move was not in the $-Z$ direction (No), the controller memory is checked to determine if the counter reading is less than 3 ($k<3$) (step f). If so (Yes), the gripper is moved horizontally, in the direction opposite the last move in the current axis (step f1) and the program returns to START (step f2). If k is not less than 3 (that is k=3), (No) in step f, then the current axis is changed (step g) and the gripper is moved one unit in the current axis (step h) the counter is reset to ZERO (step i) and the program returns to START.

Thus, in accordance with the program of FIG. 3, the system always attempts first to move in one horizontal direction, i.e, the +X direction. The computer holds the count of the number of consecutive unit moves made in either the X or Y direction, whichever is the current axis, without reducing the interference of the peg. The variable k is initialized to 0 and it is incremented any time a move in X or Y fails to reduce the interference of the pin. Whenever the value of k reaches 3, that is whenever three consecutive moves in the X or Y direction fail to reduce interference of the pin, the program changes the current axis from X to Y, or vice versa.

The choice of 3 as the maximum permissible value for k is critical. For, if the maximum permissible value is greater than 3, the system will always succeed in inserting the peg in the hole, but it will frequently waste time repeating moves which are already known to produce no reduction in the interference of the pin. On the other hand, if the maximum permissible value is less than 3, the system can become trapped in a repetitive sequence of moves in X or Y. In such instance, the system abandons the current axis prematurely, instead of making one or two additional moves in the current axis to make progress.

Referring back to FIG. 2, further details of the signal processing portion of the invention will now be described in connection therewith. As shown in FIG. 2, the output signals from the accelerometers 28 and 26, respectively, are fed to preamplifiers 30 and 40, respectively, for suitable pre-amplification in a well-known manner and then coupled to the inputs of instrumentation amplifiers 32 and 42, respectively, for further amplification, before being passed through bandpass filters 34 and 44, respectively. Bandpass filters 34 and 44 are tuned by frequency select switches 14 and 12 to the frequency of the quadrature oscillator, so that spurious signals outside of the passband of the filter will be filtered out of the signals detected by the accelerometers before being passed to respective root mean squared (RMS)-to-DC converters 36 and 46.

After conversion to DC signals and amplification by amplifiers 38 and 48, respectively, the detected accelerometer signals are converted from analog DC signals to digital form in A-D converters 50 and 60, respectively, and coupled to a data processor in robot controller 52, wherein they are used as inputs to robot servo mechanism 70 to control the movement of gripper 11 in the X,Y and Z directions.

In an alternative embodiment, the X and Y signals from the robot controller 52 may be coupled back to cosine amplifier 18 and sine amplifier 16, respectively, to control the movement of the shakers 22 and 20, respectively. In this embodiment, the X and Y signals from the robot controller 52 are disconnected by switches 90 and 92, respectively, from the robot servo 70 and instead coupled back through amplifiers 80 and 82 to shaker drive amplifiers 18 and 16, respectively. With this arrangement, the controller can displace the hole 6 in the XY plane, relative to the pin. The pin is now moved by the servo 70 in the Z direction only. The vibration of the hole 6 continues to be driven by the oscillator 10 as before. The advantage of this alternative embodiment is that the shakers 20,22 and therefore the displacement of the hole 6 can be driven with much finer resolution than is ordinarily possible with a robot, thereby making possible pin-hole centering with very tight tolerances.

EQUIVALENTS

This completes the description of the preferred embodiments of the invention. It will be obvious to those skilled in the art, without departing from the invention in its broader aspects, to devise equivalents thereto. Such equivalents are intended to be part of this invention and covered by the following claims.

We claim:

1. A method of inserting a part having a cylindrical projection into a hole in another part wherein either the end of the projection or the edge of the hole is chamfered, comprising the steps of:
    (a) positioning the projection adjacent the hole in the other part;
    (b) vibrating one part in relation to the other part in a plane orthogonal to the direction of insertion of said projection into said hole;
    (c) moving one part with respect to the other part in the direction of insertion of the projection until contact is made with an edge of said hole;
    (d) sensing the interference resulting from such contact and generating a signal proportional thereto;
    (e) in response to said signal, repositioning one part relative to the other in said orthogonal plane in a direction which reduces said interference;
    (f) repeating steps (c), (d) and (e) until the projection is completely inserted in the hole.

2. The method of claim 1 wherein the vibration is circular in one plane.

3. The method of inserting a cylindrical projection on one part into a hole in another part wherein either the end of the projection is chamfered or the edge of the hole is chamfered comprising the steps of:
    (a) positioning the projection adjacent the hole in the other part and vibrating one part with respect to the other in a plane orthogonal to the direction of insertion;
    (b) moving one part a first increment with respect to the other part in a direction orthogonal to said plane;
    (c) sensing if contact is made between said parts;
    (d) if no contact is made in step (b), repeating step (b) and storing a count number;
    (e) if contact is made in step (b), determining if the interference resulting from the contact is greater or less than after the previous move in the plane;
    (f) if interference is determined to be less in step (e), moving one part one increment with respect to the other in the direction of the previous move and repeating steps (c) and (d) or (e);
    (g) if interference in step (e) is determined to be greater in step (e), then incrementing the stored count number one unit and determining whether the previous move was made in said first direction:
    (h) if the answer in step (g) is YES, then moving one part one increment with respect to the other in the same direction and repeating step (b);
    (i) if the answer in step (g) is NO, checking the stored count to determine if it is less than 3 units;

(j) if the count in step (i) is less than 3 units, moving one part in the plane in a direction opposite to the last move and step (b) is repeated;

(k) if the count in step (i) is not less than 3 units, moving one part in the plane on an axis orthogonal to the previous axis and resetting the count to ZERO; and repeating steps (b)–(e).

4. Apparatus for inserting a part having a cylindrical projecting end into a hole in another part, wherein either the hole or the projection is beveled, comprising:

(a) gripper means for holding one part adjacent the other with the projecting end nearest the hole;

(b) shaker means for vibrating one part in relation to the other part in a plane orthogonal to the direction of insertion of said projecting end into said hole;

(c) controller means for moving one part with respect to the other in the direction of insertion until contact is made between the end of the projection and the edge of said hole;

(d) sensor means for sensing such contact and generating interference signals proportional thereto, the sensor means comprising a pair of accelerometers, one of which is sensitive to contact between hole and projection in one direction, the other one of which is sensitive to contact between hole and projection in a direction orthogonal thereto and wherein each generates a separate interference signal which are separately filtered in filter means;

(e) signal processor means for processing said signals and coupling said signals to said controller means, which controller means, in response to said signals, repositions one part in said orthogonal plane in a direction which reduces or eliminates said interference until the projection is completely inserted in the hole.

5. The apparatus of claim 4 including converter means for converting the separate interference signals to D.C. analog signals and the analog signals to corresponding digital signals.

6. The apparatus of claim 5 wherein the shaker means includes an oscillator means for generating sine and cosine signals to vibrate one part with respect to the other in a circular motion in a plane orthogonal to the direction of insertion.

7. The apparatus of claim 6 wherein the controller means in response in response to said analog signals generates an X direction signal and Y direction signal.

8. The apparatus of claim 7 wherein the X direction signal and Y direction signal are coupled to said oscillator means for controlling the motion of said shaker means.

* * * * *

UNITED STATES PATENT AND TRADEMARK OFFICE
CERTIFICATE OF CORRECTION

PATENT NO. : 4,804,896

DATED : Feb. 14, 1989

INVENTOR(S) : G. Dudley Shepard, I. Stuart Smith, Stephen R. Christensen and Richard Lu It is certified that error appears in the above—identified patent and that said Letters Patent is hereby corrected as shown below:

Column 8, line 20, delete "in response" (second occurrence).

Signed and Sealed this

Twelfth Day of September, 1989

Attest:

DONALD J. QUIGG

Attesting Officer

Commissioner of Patents and Trademarks